United States Patent [19]

Thomas

[11] Patent Number: 4,726,701
[45] Date of Patent: Feb. 23, 1988

[54] MODULAR SHELF ASSEMBLY

[76] Inventor: Olivier A. Thomas, P.O. Box 811, Warren, Mich. 48090

[21] Appl. No.: 860,792

[22] Filed: Jun. 19, 1986

[51] Int. Cl.$^4$ .............................................. F16B 1/00
[52] U.S. Cl. .................................. 403/172; 403/176; 403/180; 403/205
[58] Field of Search .................. 312/257 SK, 257 SM, 312/140; 403/169, 170, 171, 172, 173, 174, 175, 180, 205, 403, 176; 108/144

[56] References Cited

U.S. PATENT DOCUMENTS

| | | | |
|---|---|---|---|
| 2,904,360 | 9/1959 | Gamlen | 403/172 X |
| 3,229,790 | 1/1966 | Shayne | 403/122 |
| 3,315,994 | 4/1967 | Rifken | 403/169 |
| 3,542,407 | 11/1970 | Brown | 403/174 X |
| 4,078,847 | 3/1978 | Presnick | 403/171 X |
| 4,230,052 | 10/1980 | Champagne | 108/144 |
| 4,413,570 | 11/1983 | Haigh | 403/172 X |
| 4,473,315 | 9/1984 | Latchinian | 403/172 |
| 4,544,069 | 10/1985 | Cavallini | 403/172 X |

FOREIGN PATENT DOCUMENTS

| | | | |
|---|---|---|---|
| 229470 | 7/1960 | Australia | 403/71 |
| 3033114 | 3/1982 | Fed. Rep. of Germany | 403/171 |
| 489,926 | 1/1954 | Italy | |

Primary Examiner—Randolph A. Reese
Assistant Examiner—Peter M. Cuomo
Attorney, Agent, or Firm—Krass & Young

[57] ABSTRACT

A modular assembly for use in forming an article of furniture or the like including a connector member for joining together three elongated members on mutually perpendicular axes. The connector member includes three pairs of flanges which are received respectively in U-shaped channels in the three elongated members with the members secured in each case to the connector member by a clamping member which clamps the flanges of the elongated member between the flanges on the connector member and flange portions on the clamping member. The portions of the connector member receiving the horizontal elongated members are recessed inwardly or rearwardly from the connector member portion receiving the vertical member so that the ends of the horizontal elongated members may pass behind the vertical member to hide the raw edges of the horizontal members. The connector member and the various fastening elements are essentially totally hidden from view in the final assembly.

17 Claims, 10 Drawing Figures

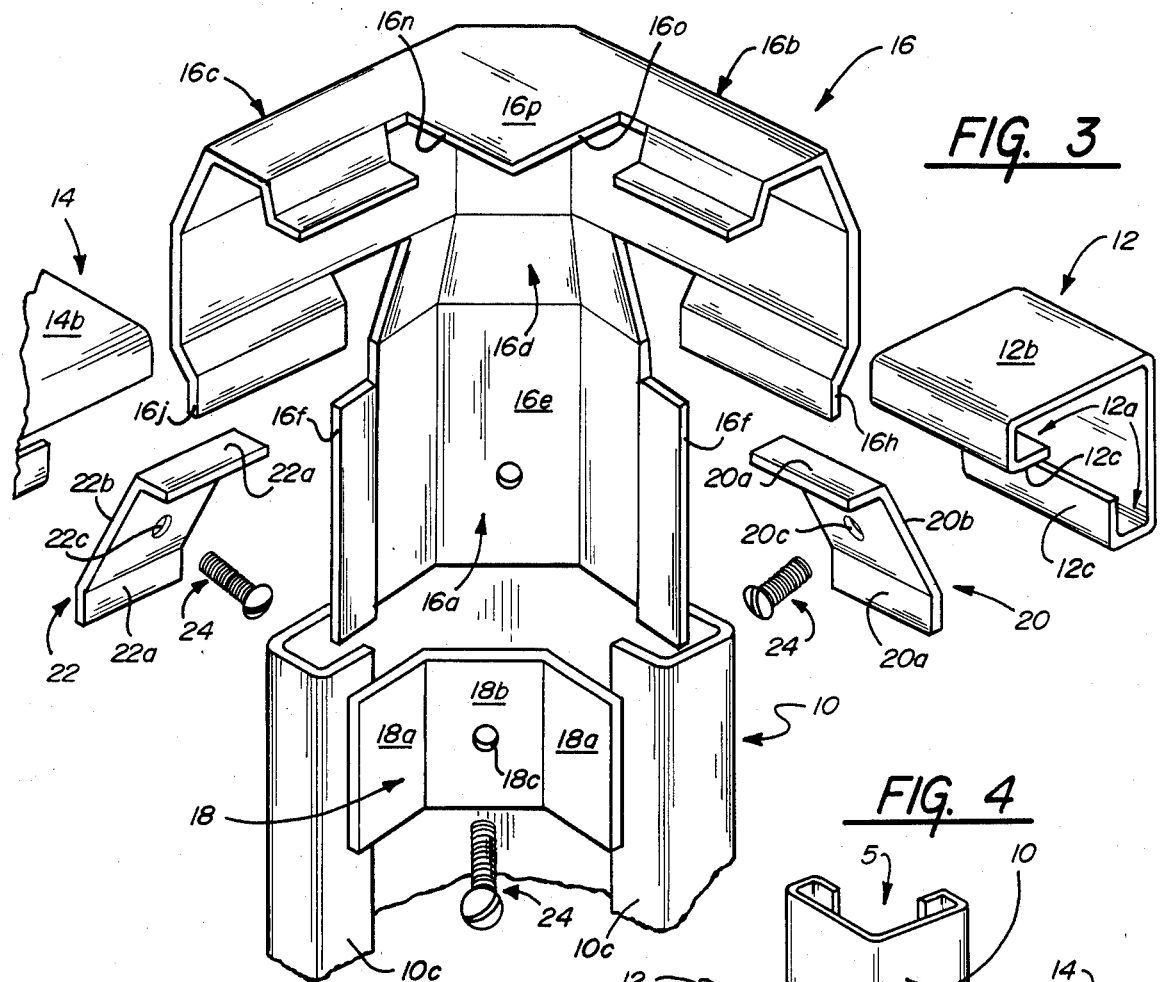

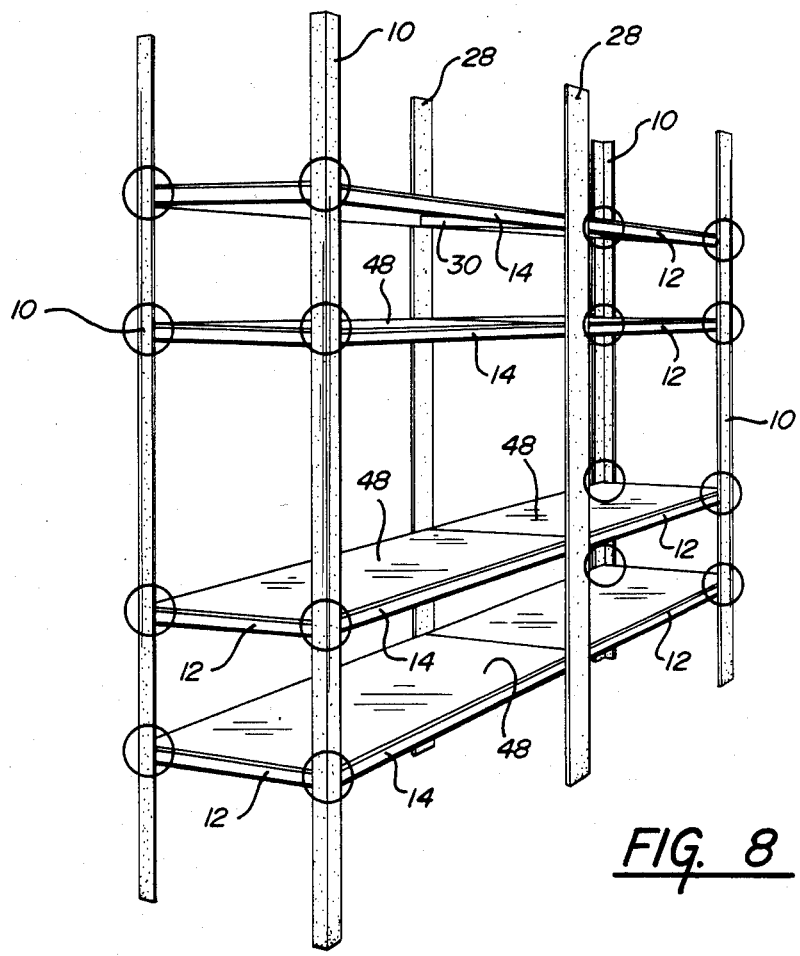
FIG. 8
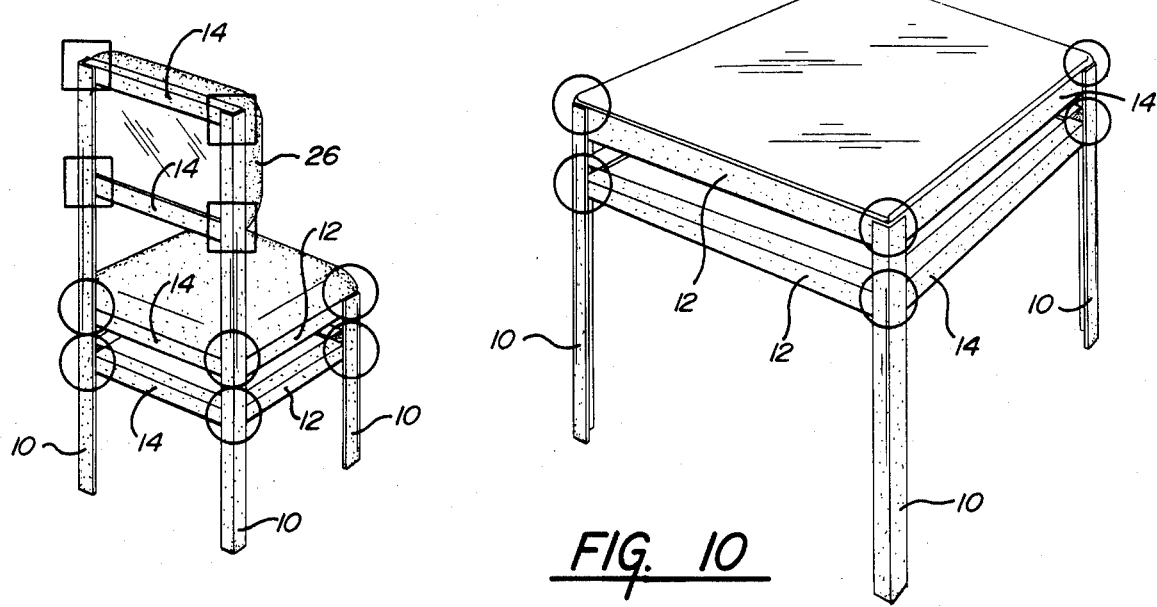
FIG. 9
FIG. 10

MODULAR SHELF ASSEMBLY

BACKGROUND OF THE INVENTION

This invention relates to modular assemblies and more particularly to modular assemblies particularly suitable for use in forming articles of furniture such as shelving.

Shelving has been in use for centuries as a means of storing and displaying various commodities. Modular type shelving has gained popularity in recent years because of its versatility and ready assembly. Various arrangements and constructions have been proposed to facilitate the ready and efficient construction of modular shelving. The various prior art modular constructions, however, have embodied certain disadvantages. Specifically, they have either been very simple in design and assembly but relatively crude in appearance, or have been sophisticated in appearance but very complicated and expensive in design.

SUMMARY OF THE INVENTION

This invention is directed to a modular shelving design which is of a simple and inexpensive design but which presents a sophisticated, finished appearance.

More specifically, this invention is directed to the provision of a modular shelving assembly of simple design in which none of the fastener assemblies securing together the various elements of the modular assembly, nor any of the raw edges of the various elements, are visible in the final assembly.

The modular assembly of the invention includes first, second and third elongated members; a connector member; a clamp member; and a fastener assembly. The first elongated member has a cross section defining a pair of confronting U-shaped channel portions connected by a frontal web portion with each channel portion including a flange portion at the rear of the member spaced from the flange portion of the other channel portion to define an elongated central slot therebetween providing access to the interior of the member. The connector member includes a first portion defining a pair of flanges for respective receipt in the U-shaped channel portions of the first elongated member, a second portion adapted to be secured to an end of the second elongated member, and a third portion adapted to be secured to an end of the third elongated member. The clamp member includes a pair of flange portions connected by a central web portion with the flange portions adapted to seat respectively on the outer, rear surfaces of the flange portions of the first elongated member and the web portion adapted to span the slot therebetween. The fastener assembly is adapted to draw the clamp member toward the flanges of the first portion of the connector member to clampingly sandwich the flange portions of the channel portions of the first elongated member therebetween. This simple arrangement allows the first portion of the connector member to be totally hidden within the first elongated member in the finished configuration of the assembly.

According to a further feature of the invention, the connector member further includes a fourth connector portion interconnecting the first portion thereof with the second and third portions thereof and sized and configured to pass rearwardly outwardly through the slot in the first elongated member with the flanges of the first portion positioned respectively in the U-shaped channel portions of the first elongated member. This arrangement allows the first portion of the connector member to be hidden within the first elongated member and positions the second and third portions of the connector member rearwardly and outside of the first elongated member for respective connection to the second and third elongated members.

According to a further feature of the invention, the second and third connector member portions extend at right angles with respect to the first connector member portion and are respectively parallel to a respective flange of the first connector member portion, and the second and third connector member portions are spaced rearwardly from the rear face of the respective first connector member flange. This arrangement allows the flange portions of the first elongated member to pass between the flanges of the first connector member portion and the second and third connector member portions so that the connector member may be positioned at any point along the length of the first elongated member, and further allows the ends of the second and third elongated members to pass behind the first elongated member so that the raw end edges of the second and third elongated members are hidden from view behind the first elongated member.

According to a further feature of the invention, the second and third connector member portions are positioned above the first connector member portion so as to allow the clamping member to access the connector member portion through the slat in the first elongated member without interference from the second and third connector member portions.

According to a further feature of the invention, the second and third elongated members each have a cross section defining a pair of confronting U-shaped channel portions connected by a frontal web portion with each channel portion including a flange portion at the rear of the member spaced from the flange portion of the other channel portion to define an elongated central slot therebetween providing access to the interior of the member; the second and third portions of the connector member each define a pair of flanges for respective receipt in the U-shaped channel portions of the second and third elongated members; and second and third clamp members, each including a pair of flange portions connected by a central web portion, are provided for coaction with the second and third portions of the connector member to clampingly secure the second and third elongated members to the second and third portions of the connector member. This arrangement serves to further hide the fastening elements of the assembly and further contributes to the sophisticated, finished appearance of the assembly.

In one disclosed embodiment of the invention, the web portion of the first portion of the connector member has a right angle configuration and the three elongated members are mutually perpendicular to each other. In a second embodiment, the web portion of the first portion of the connector member is planar and the second and third elongated members are in alignment with each other and perpendicular to the first elongated member. These different embodiments increase the versatility and flexibility of the invention modular assembly and enable the assembly to be used to build a wide variety of shelving or other furniture configurations.

BRIEF DESCRIPTION OF THE DRAWINGS

FIG. 3 is a exploded perspective view of the modular assembly looking in the opposite direction from FIG. 1;

FIG. 4 is a fragmentary perspective view showing the modular assembly in an assembled configuration;

FIG. 5 is a fragmentary perspective view taken in the direction of the arrow 5 in FIG. 4;

FIG. 6 is a cross-sectional view taken on line 6—6 of FIG. 5;

FIG. 8 is a perspective view of a shelving assembly embodying the modular assemblies of the invention;

FIG. 9 is a perspective view of a chair embodying the modular assemblies of the invention; and FIG. 10 is a perspective view of a table embodying the modular assemblies of the invention.

DETAILED DESCRIPTION OF THE PREFERRED EMBODIMENT

Figure 1:
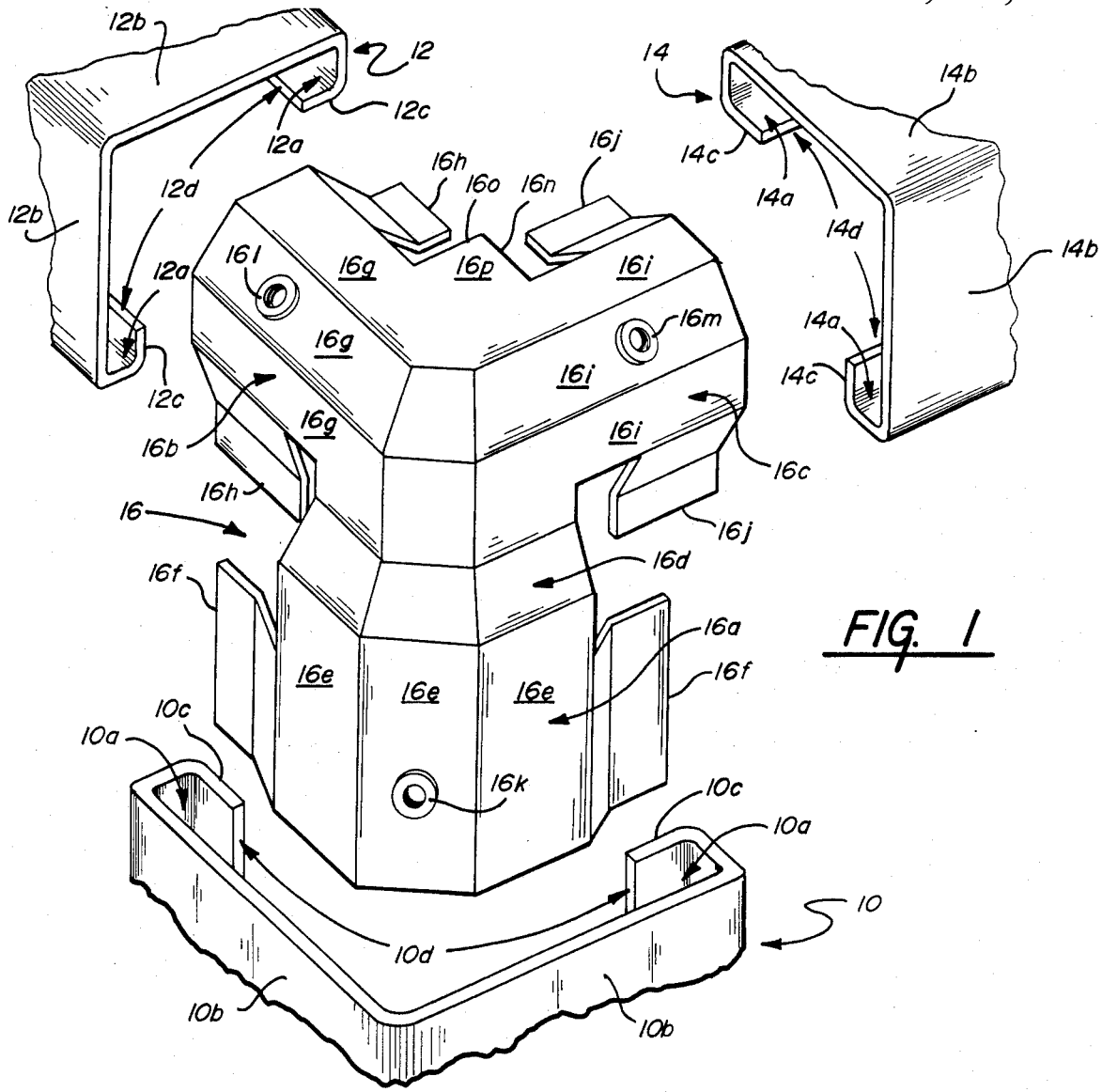
FIG. 1 is a fragmentary perspective view of a modular assembly according to the invention.

The modular assembly seen in FIGS. 1-6 includes a first elongated member 10; a second elongated member 12; a third elongated member 14; a connector member 16; a first clamp member 18; a second clamp member 20; a third clamp member 22; and a plurality of fastener members 24.

All of the members are preferably formed of a suitable steel material.

Elongated member 10 comprises a right angle channel member and has a cross section defining a pair of confronting U-shaped channel portions 10a connected by a right angle frontal web portion 10b with each channel portion 10a including a flange portion 10c at the rear of the member spaced from the flange portion of the other channel portion to define an elongated central slot 10d therebetween providing access to the interior of the channel member. It will be understood that, although member 10 is shown in fragmentary form, it will have a length depending upon the particular application intended.

Elongated member 12 is similar in general configuration to member 10 but of lesser dimensions. Specifically, member 12 has a cross section defining a pair of confronting U-shaped channel portions 12a connected by a right angle frontal web portion 12b with each channel portion including a flange portion 12c at the rear of the member spaced from the flange portion of the other channel portion to define an elongated central slot therebetween providing access to the interior of the member.

Elongated member 14 is identical in cross sectional configuration to member 12. Specifically member 14 has a cross section defining a pair of confronting U-shaped channel portions 14a connected by a right angle frontal web portion 14b with each channel portion 14a including a flange portion 14c at the rear of the member spaced from the flange portion of the other channel portion to define an elongated central slot 14d therebetween providing access to the interior of the member.

Connector member 16 is formed as a one piece stamping and includes a first portion 16a, a second portion 16b, a third portion 16c and a fourth portion 16d.

First connector member portion 16a extends generally vertically and includes a right angle web portion 16e and a pair of flanges 16f disposed at right angles with respect to each other.

Second connector member portion 16b includes a right angle web portion 16g and a pair of flanges 16h at the opposite ends of the web portion and disposed at right angles with respect to each other. Connector member portion 16b extends generally horizontally at a right angle with respect to the vertical extent of portion 16a, and generally parallel to and above the related flange 16f of first portion 16a.

Third connector member portion 16c includes a right angle web portion 16i and a pair of flanges 16j at opposite ends of the web portion and disposed at right angles with respect to each other. Portion 16c extends generally horizontally, at right angles with respect to portions 16a and 16b, and generally above and parallel to the related flange 16f of portion 16a. Portions 16a, 16b, and 16c thus extend in three mutually perpendicular directions to provide an X, Y, and Z axis capability for the connector member.

Fourth connector member portion 16d interconnects the first portion 16a with the second and third portions 16b and 16c and extends upwardly and rearwardly relative to portion 16a so as to dispose portions 16b and 16c upwardly and rearwardly with respect to portion 16a.

Clamp member 18 includes a pair of flange portions 18a connected by a central web portion 18b having a central aperture 18c. Flange portions 18a are disposed at right angles with respect to each other and web portion 18b is disposed at a 45° angle with respect to the planes of the flange portions 18a.

Clamp member 20 is similar to clamp member 18 but of smaller dimensions and includes flange portions 20a disposed at right angles with respect to each other, a central web portion 20b, and an aperture 20c in web portion 20b.

Clamp member 22 is identical to clamp member 20 and includes flange portions 22a, a central web portion 22b, and an aperture 22c in web portion 22b.

Fasteners 24 are standard screw bolts and are intended for threaded coaction with internally threaded bosses 16k, 16l and 16m integrally formed respectively in the outer faces of the web portions of the first, second and third portions of connector member 16.

The assembled relation of the modular assembly is seen in FIGS. 2, 4, 5 and 6.

In assembled relation, the flanges 16f of connector member first portion 16a are positioned in channels 10a of member 10; clamp member 18 is positioned with its flange portions 18a seated on the outer rear surfaces of the flange portions 10c of member 10 and its web portion 18b spanning the slot 10d therebetween, and fastener member 24 passes through aperture 18c in web portion 18b of clamp member 18 for threaded engagement with threaded boss 16k to draw the clamp member toward the flanges 16f of the connector member to clampingly sandwich the flange portions 10c of the first elongated member therebetween and securely position the connector member at a selected vertical position within the elongated member 10. It will be understood that, although member 10 is illustrated in FIGS. 1 and 3 as terminating below the connector member, in actuality it would typically extend to a location above the connector member so that the connector member would typically be secured by clamp member 18 in an intermediate position along the vertical height of the elongated member 10.

Similarly, flanges 16h of connecter member portion 16b are positioned within channel portions 12a of elongated member 12, flange portions 12a of clamp member 20 are seated on the outer rear surfaces of the flange portions 12c of member 12 with web portion 20b spanning slot 12d, and a fastener member 24 passes through aperture 20c in web portion 20b of clamp member 20 for threaded engagement with boss 16l to draw the clamp member toward the flanges 16h to clampingly sandwich the flange portions 12c of member 12 therebetween and thereby securely fasten the end of member 12 to connector member portion 16b.

Similarly, flange 16j of connector member portion 16c are positioned within channel portion 14a of member 14, flange portions 22a of clamp member 22 are seated on the outer rear surfaces of flange portions 14c of member 14 with web portion 22b spanning slot 14d; and a fastener 24 passes through aperture 22c in web portion 22b of clamp member 22 for threaded engagement with threaded boss 16m to draw the clamp member toward the flanges 14j to clampingly sandwich the flange portions 14c of member 14 therebetween and thereby securely fasten the end of member 14 to connector member portion 16c.

Figure 2:
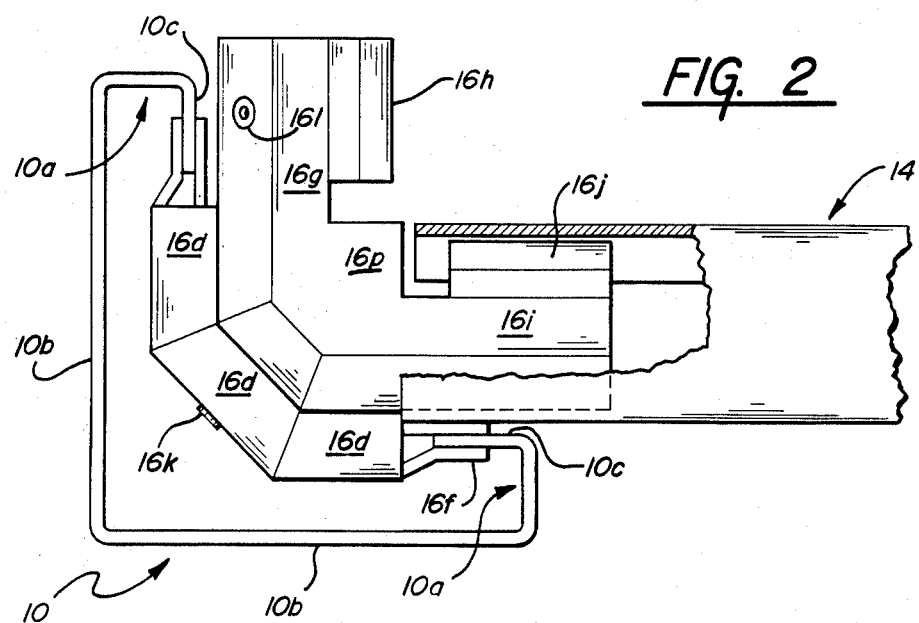
FIG. 2 is a plan view of the modular assembly of FIG. 1 with the elements assembled.

It will be understood that, since connector member portion 16d in the assembled relation of the members extends upwardly and rearwardly through slot 10d of member 10, the connector member portions 16b and 16c are spaced rearwardly from portion 16a so that, as best seen in FIG. 2, flange portions 10c of member 10 are free to pass upwardly between the rear faces of the flanges 16f and the front faces of connector member portions 16b and 16c and the ends of elongated members 12 and 14 are free to pass between the rear faces of the flange portions 10c of member 10 and the front faces of connector member portions 16b and 16c respectively. Further, since the connector member portions 16b and 16c are positioned above portion 16a, members 12 and 14 do not interfere with access to clamp member 18 so that clamp member 18 may be readily secured to and released from engagement with vertical member 10.

As best seen in FIGS. 4 and 5, the invention modular assembly, in its assembled condition, presents a clean and uncluttered appearance. Specifically, there are no connector members or fasteners visible from the front of the unit but, rather, the connector member and fasteners are essentially hidden within the respective channel members and there are no raw or cut edges visible since the channel members 12 and 14 tuck neatly behind member 10. Even when viewed, as in FIG. 5, from inside the vertical member 10, the appearance is essentially uncluttered and finished since the ends of the members 12 and 14 snug up against the edges 16n and 16o of the stop portion 16p provided at the upper face of the connector member. The upper face of the connector member stop portion 16p and the upper faces of the members 12 and 14 thus coact to present a substantially flush, neat appearance even as viewed from inside of the elongated member 10. The invention modular assembly has the further advantage that, even though the fastener elements are essentially hidden from view in the assembled relation of the members, the fastener elements are readily accessible for assembly and disassembly purposes.

Figure 7:
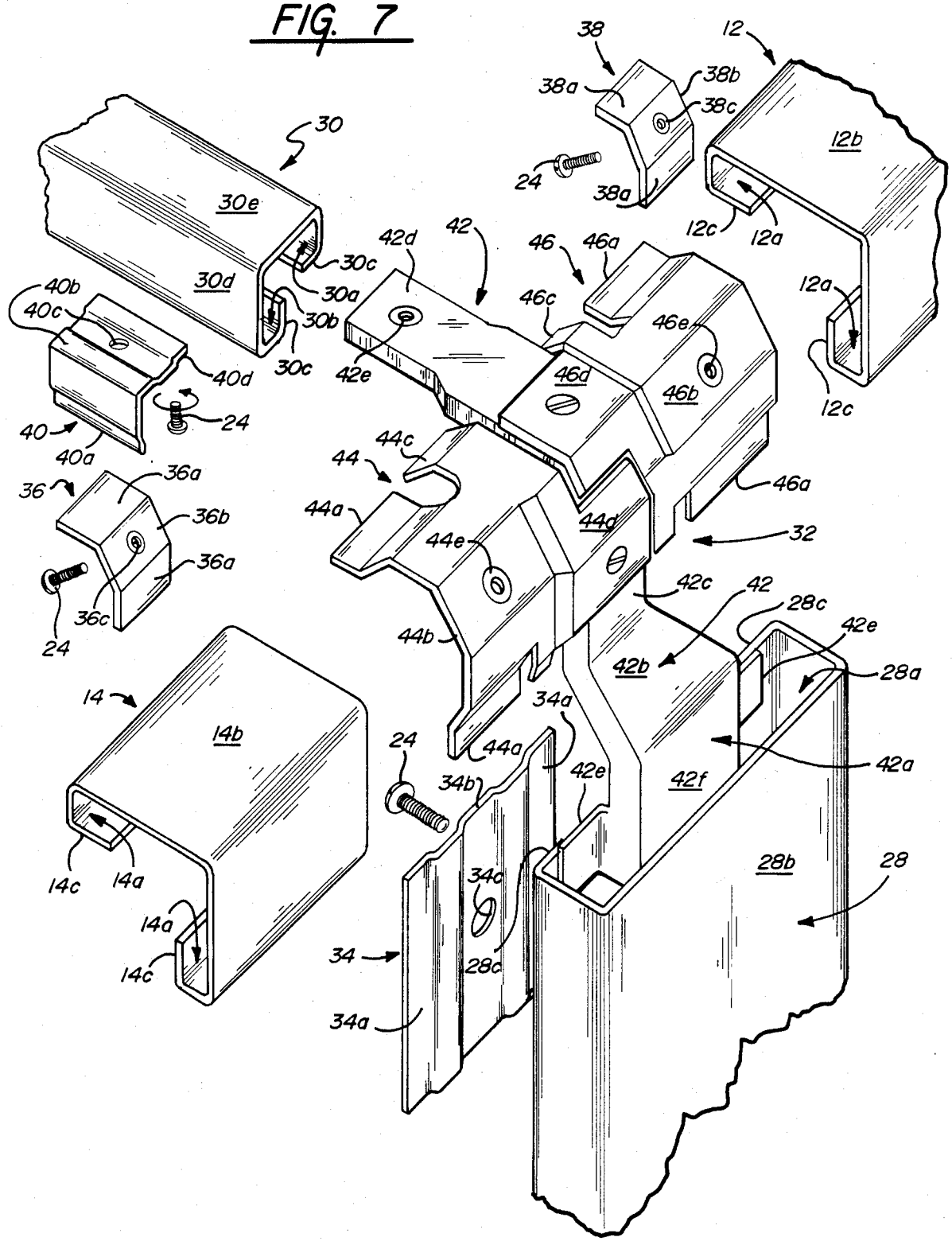
FIG. 7 is an exploded perspective view of a modified form of the invention modular assembly.

It will be understood that the modular assembly shown in FIGS. 1–6 is intended for use whereever a corner configuration is required involving three mutually perpendicular axes. Specifically, with reference to the shelving assembly of FIG. 8, the modular assembly of FIGS. 1–6 would be used in each of the circled locations on the shelving assembly; with reference to the chair of FIG. 9, it would be used in each of the circled locations on the chair; and with reference to the table of FIG. 10, it would be used in each of the circled locations on the table. With further reference to the chair of FIG. 9, the modular assembly of FIGS. 1–6 could also be used in the locations indicated by a square by specially outfitting the cushion 26 to receive the connector member portion 16c or 16b, depending upon the orientation of the various members. With further reference to the shelving assembly of FIG. 8, shelving assemblies often further require intermediate vertical members 28 to support the shelves between the corner post. A modular assembly for use in connection with intermediate members 28 is seen in FIG. 7. Specifically, the modular assembly of FIG. 7 is intended to provide interconnection between intermediate upright members 28, horizontal elongated members 12 and 14, and intermediate rearwardly extending shelf support members 30.

The modular assembly of FIG. 7, in addition to elongated members 12, 14 and 30, includes a connector member assembly 32, clamp members 34, 36, 38 and 40, and fastener members 24.

Connector member assembly 32 includes a first connector member 42, a second connector member 44, and a third connector member 46.

Member 42 includes a first portion 42a, a second portion 42b, a third portion 42c, and a fourth portion 42d. Portion 42a extends generally vertically and includes a pair of coplanar flanges 42e connected by a central U-shaped web portion 42f. Portion 42b extends upwardly and rearwardly with respect to portion 42a and interconnects portion 42a and portion 42c.

Portion 42c extends vertically upwardly from the upper end of portion 42b for connection at its upper end with the forward end of portion 42d.

Portion 42d extends rearwardly from the upper end of portion 42c for coaction with member 30.

Members 44 and 46 are identical and are shown secured to member 42 in respectively reverse fashion to provide respective connection with members 14 and 12.

Member 44 includes a pair of flanges 44a disposed at right angles with respect to each other and interconnected by a central right angle web portion 44b, a stop portion 44c, and a mounting portion 44d.

Similarly, member 46 includes a pair of flanges 46a, a right angle web portion 46b, a stop portion 46c, and a mounting portion 46d.

Clamp member 34 includes a pair of flange portions 34a, a web portion 34b, and an aperture 34c in web portion 34b; clamp member 36 includes a pair of flange portions 36a disposed at right angles with respect to each other, a web portion 36b, and an aperture 36c in web portion 36b; clamp member 38 includes a pair of flange portions 38a disposed at right angles with respect to each other, a web portion 38b, and an aperture 38c in web portion 38b; and clamp member 40 includes a pair of flange portions 40d disposed at right angles with respect to each other, a right angle web portion 40b, and an aperture 40c in web portion 40b.

In the assembled relation of the modular assembly of FIG. 7, flange portions 42e of connector 42 are positioned in channel portions 28a of member 28; flange portions 34a of clamp member 34 are seated on flange portions 28c of member 28 and a fastener 24 extends through aperture 34c for engagement with a threaded boss (not shown) in the web portion 42f of member 42 to clamp flanges 28c between connector member flanges 42e and clamp member flanges 34a; connector member portion 42b extends upwardly and rearwardly through the slot in the rear face of member 28 defined between flange portion 28c to dispose connector members 44 and 46 in a rearwardly disposed relation with respect to flanges 28c of member 28; flanges 44a are received in channel portions 14a of member 14; flange portions 36a of clamp member 36 are seated against the rear or undersurface of flange portions 14c of member 14 with a fastener 24 passing through aperture 36c for threaded coaction with a threaded boss 44e in web portion 44b to clamp flange portions 14c between flange portions 44a and flange portions 36a; flange portions 46a of connector member 46 are positioned in channel portions 12a of member 12; flange portions 38a of clamp member 38 are seated on the rear or underfaces of flange portions 12c of member 12 with a fastener member 24 passing through aperture 38c for threaded coaction with threaded boss 46e to clamp flange portions 12c between flange portions 46a and flange portions 38a; connector member portion 42d is telescopically received in channel portion 30a of member 30; flange portions 40a of clamp member 40 are seated against flange portions 30c of member 30 with a threaded fastener 24 passing through aperture 40c for engagement with threaded boss 42e on connector member portion 42d to clamp the related flange 40a of clamping member 40 against the undersurface of flange 30c and secure member 30 to connector portion 42d.

As with the modular assembly of FIGS. 1-6, with the modular assembly of FIG. 7 in its assembled relationship, the rearward disposition of connector members 44 and 46 relative to flanges 42e allows flanges 28c to pass upwardly between flanges 42e and connector members 44 and 46 to allow the connector member assembly to be selectively positioned along the vertical height of member 28, and the rearward disposition of connector members 44 and 46 further allows the members 12 and 14 to pass behind the upright member 28 so that no raw or cut edges are presented in the final assembly.

A shelving assembly of the type seen in FIG. 8 can be readily constructed by the use of the modular assemblies of FIGS. 1-6 and FIG. 7 with the FIGS. 1-6 assemblies providing the various corner constructions and the FIG. 7 assemblies providing the intermediate structures between the corner assemblies. Panels or shelves 48 would typically be supported on the members 12, 14 and 30 and, with reference to FIG. 5, it will be seen that the invention construction does not require any corner notching of the shelves, but rather, the natural uncut right angle corners of the shelves are free to extend into the hollow, rear interior of members 10.

The multipiece construction of connector member 42 also provides flexibility with respect to the modular assembly of FIG. 7. Specifically, if, as viewed in FIG. 8, it is desired to form an intermediate joint construction in which there is no member 14 or related shelves to the left of upright 28, connector member 44 is simply omitted from the assembly and the face 30d of member 30 provides a smooth, wide area finished face at the side of member 30 exposed by the omitted shelve. Similarly, if it is desired to form a joint without a member 12 or related shelves, as viewed in FIG. 8, connector member 46 is simply omitted from the assembly and member 30 is rotated through 90° so as to present a smooth, finished surface 30e to the open side of the shelving created by the omission. As shown by the arrow in FIG. 7 clamp member 40 may also be moved through 90° to accommodate the fixing of the member 30 to connector portion 42d in either orientation of the member 30.

The modular assemblies of the invention will be seen to provide a simple and inexpensive construction for readily forming shelving or other articles of furniture, and yet a construction in which the final article presents a highly finished appearance since the fastener and connector members are essentially hidden and the raw edges of the various members are totally blocked from view. The invention modular assemblies also provide total flexibility in formulating articles of furniture since virtually any article of furniture can be constructed using the corner assembly of FIGS. 1-6 in combination with the intermediate assembly of FIG. 7. For example, and as previously noted, chairs, tables and shelving may be readily constructed using the modular assemblies of the invention.

Whereas preferred embodiments of the invention have been illustrated and described in detail, it will be apparent that various changes may be made in the disclosed embodiments without departing from the scope or spirit of the invention.

I claim:

1. A modular assembly, for use in forming an article of furniture or the like, comprising:
  (A) a first elongated member having a cross section defining a pair of confronting U-shaped channel portions connected by a frontal web portion with each channel portion including a flange portion at the rear of the member spaced from the flange portion of the other channel portion to define an elongated central rear slot therebetween extending lengthwise of the member at the rear side thereof and providing access therethrough to the interior of the member;
  (B) a second elongated member;
  (C) a third elongated member;
  (D) a connector member having
    (1) a first portion defining a pair of flanges for respective receipt in the U-shaped channel portions of said first elongated member,
    (2) a second portion adapted to be secured to an end of said second elongated member,
    (3) a third portion adapted to be secured to an end of said third elongated member; and
    (4) a fourth portion connected at a forward end portion thereof to said first connector member portion and connected at a rearward end portion thereof to said second and third connector member portions and sized and configured to extend, with said first connector member portion positioned within said interior of said first elongated member with said flange portions thereof positioned respectively in said U-shaped channel portions of said first elongated member, rearwardly outwardly from said first connector member portion through said rear slot in said first elongated member to dispose said second and third connector member portions outside of said interior of said first elongated member to factilitate respective connection of said second and third elongated members thereto;
  (E) a clamp member including a pair of flange portions connected by a central web portion with the flange portions adapted to seat respectively on the outer rear surfaces of said flange portions of said first elongated member and said web portion adapted to span said rear slot of said first elongated member; and (F) a fastener assembly adapted to draw the clamp member toward said flanges of said first portion of said connector member to clampingly sandwich said flange portions of said channel portions of said first elongated member therebetween to selectively secure said connector member to said first elongated member in any desired position of longitudinal adjustment therealong.

2. A modular assembly according to claim 1 wherein:
(G) said fastener assembly includes a screw member adapted to pass through a hole in said web portion of said clamp member and through said rear slot for engagement with said first portion of said connector.

3. A modular assembly according to claim 1 wherein:
(G) said web portion of said first elongated channel member has a right angle configuration so that said flange portions of said channel portions are disposed at right angles with respect to each other; and
(H) said flanges on said first portion of said connector member are disposed at right angles with respect to each other for respective receipt in the channel portions of said first elongated member.

4. A modular assembly according to claim 1 wherein:
(G) said web portion of said elongated member is planar so that said flange portions of said channel portions are substantially coplanar; and
(H) said flanges on said first portion of said connector member are substantially coplanar for respective receipt in the channel portions of said first elongated member.

5. A modular assembly according to claim 1 wherein:
(G) said second and third portions of said connector member extend at right angles with respect to said first portion.

6. A modular assembly according to claim 5 wherein:
(H) said second and third portions of said connector member extend at right angles with respect to each other.

7. A modular assembly according to claim 1 wherein:
(G) said second and third elongated members each have a cross section defining a pair of U-shaped channel portions connected by a frontal web portion with each channel portion including a flange portion at the rear of the member spaced from the flange portion of the other channel portion to define an elongated central slot therebetween providing access to the interior of the member; and
(H) said second and third portions of said connector member each define a pair of flanges for respective receipt in the U-shaped channel portions of said second and third elongated members.

8. A modular assembly according to claim 7 wherein said assembly further includes:
(i) second and third clamp members each including a pair of flange portions connected by a central web portion with the flange portions adapted to seat respectively on the outer surfaces of the flange portions of said second and third elongated members and the web portion adapted to span the slot therebetween; and (J) second and third fastener assemblies adapted to draw the respective second and third clamp members toward the flanges of the respective portions of said connector member to clampingly sandwich the flange portions of the channel portions of the respective elongated members therebetween.

9. A modular assembly according to claim 8 wherein:
(K) second and third fastener assemblies each include a screw member adapted to pass through a hole in the related clamp member and through the central slot of the related elongated member for engagement with the related portion of the connector member.

10. A modular assembly according to claim 1 wherein:
(G) said second and third connector member portions extend at right angles with respect to said first connector member portion and are respectively parallel to a respective flange of said first connector member portion; and
(H) said second and third connector member portions are spaced rearwardly from the rear face of the respective first connector member flange to allow the respective flange portion of said first elongated member to pass therebetween.

11. A modular assembly according to claim 10 wherein:
(I) said flanges of said first connector member portion are disposed at right angles with respect to each other; and
(J) said second and third connector member portions extend at right angles with respect to each other.

12. A connector member, for use in forming articles of furniture or the like, comprising:
(A) a first vertically extending portion defining first and second vertically planar flange portions connected by a vertically extending frontal web portion;
(B) a second horizontally extending portion positioned generally above said first flange portion of said first portion and defining a pair of horizontally extending flange portions connected by a horizontally extending web portion;
(C) a third horizontally extending portion positioned generally above said second flange portion of said first portion in general horizontal alignment with said second portion and defining a pair of horizontally extending flange portions connected by a horizontally extending web portion; and
(D) a fourth, connector portion interconnecting the upper end of said first portion and the lower ends of said second and third portions and extending rearwardly relative to said first portion to respectively and totally position said second and third portions in rearwardly spaced relation to the vertical planes of said first and second planar flange portions of said first portion.

13. A connector member according to claim 12 wherein:
(E) said flange portions of each of said first, second and third connector member portions are disposed at right angles with respect to each other.

14. A connector member according to claim 13 wherein:
(F) an aperture is provided in the web portion of each of said first, second and third connector member portions for receipt of a respective fastener member.

15. A connector member according to claim 12 wherein:
(E) said second and third portions are in alignment with each other; and
(F) said connector member includes a fifth horizontally extending portion extending at right angles to said second and third portions.

16. A connector member according to claim 15 wherein:
(G) said connector member is defined by first, second and third separate connector members secured together by fastener means;
(H) said first connector member defines said first, fourth and fifth connector member portions;
(I) said second connector member defines said second connector member portion; and
(J) said third connector member defines said third connector member portion.

17. A connector member according to claim 16 wherein:
(K) said second and third connector members are identical and are secured to said first connector member in respectively reversed fashion.

* * * * *